United States Patent [19]
Dickinson et al.

[11] Patent Number: 6,016,355
[45] Date of Patent: *Jan. 18, 2000

[54] CAPACITIVE FINGERPRINT ACQUISITION SENSOR

[75] Inventors: Alexander George Dickinson, Laguna Beach, Calif.; Ross McPherson, Denville, N.J.; Sunetra Mendis, Palo Alto, Calif.; Paul C. Ross, Morris Plains; John A. Tyson, Washington Township, both of N.J.

[73] Assignee: Veridicom, Inc., Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/573,100

[22] Filed: Dec. 15, 1995

[51] Int. Cl.[7] .............................. G06K 9/28; G01R 29/24
[52] U.S. Cl. ............................................ 382/124; 324/678
[58] Field of Search .................................... 382/115, 116, 382/124, 125, 126, 127, 108; 356/71; 324/519, 678, 677; 73/862.4

[56] References Cited

U.S. PATENT DOCUMENTS

| | | | |
|---|---|---|---|
| 4,290,052 | 9/1981 | Eichelberger et al. | 340/365 |
| 4,353,056 | 10/1982 | Tsikos | 340/146.3 |
| 4,543,564 | 9/1985 | Audoin et al. | 340/365 |
| 4,582,985 | 4/1986 | Lofborg | 235/380 |
| 5,136,251 | 8/1992 | George et al. | 324/678 |
| 5,294,889 | 3/1994 | Heep et al. | 324/678 |
| 5,325,442 | 6/1994 | Knapp | 382/124 |
| 5,429,006 | 7/1995 | Tamori | 382/124 |
| 5,509,083 | 4/1996 | Abtahi et al. | 382/124 |
| 5,586,042 | 12/1996 | Pisau et al. | 314/482 |
| 5,613,012 | 3/1997 | Hoffman et al. | 382/115 |

OTHER PUBLICATIONS

Kazuharu, N., Patent Abstracts of Japan, Vol. 011, No. 376, Dec. 8, 1987 and JP62 145781.
Kazuo, Y., Patent Abstracts of Japan, vol. 014, No. 569, Dec. 18, 1990 and JP02 244125.
Masahiro, S., Patent Abstracts of Japan, vol. 096, No. 012, Dec. 26, 1996 and JP08 201204.
Mitsuhiro, T., Patent Abstracts of Japan, Vol. 016, No. 078, Feb. 25, 1992 and JP03 266186.
Kazuo, K., Patent Abstracts of Japan, Vol. 097, No. 003, Mar. 31, 1997 and JP08 305832.
David A. Bell, *Solid State Pulse Circuits*, Reston Publishing Company, 1981, ISBN 0–8359–7057–4, pp. 36–38.

*Primary Examiner*—Leo H. Boudreau
*Assistant Examiner*—Brian P. Werner
*Attorney, Agent, or Firm*—Wilson, Sonsini, Goodrich & Rosati

[57] ABSTRACT

An apparatus for detecting topographic variations on an object such as a finger includes an array of sensing elements disposed on a substrate which each have a parasitic capacitance. An insulating receiving surface is disposed over the array of sensing elements and is adapted to receive the object such that a sensing element and a portion of the object located thereabove creates a measurable change in capacitance with respect to the parasitic capacitance. An electronic circuit is coupled to the array of sensing elements for measuring the measurable change in capacitance.

15 Claims, 1 Drawing Sheet

CAPACITIVE FINGERPRINT ACQUISITION SENSOR

TECHNICAL FIELD

The present invention relates generally to a sensor for detecting topographic variations such as a fingerprint, and more particularly to a sensor for detecting topographic changes due to changes in capacitance.

BACKGROUND OF THE INVENTION

In a fingerprint acquisition system a finger is placed contact with a flat surface that senses the pattern of ridges and valleys on the finger. Acquisition is often accomplished by optical techniques that provide an electronic image of the fingerprint. For example, the fingerprint may be optically imaged onto a light-sensitive detector such as a charge-coupled device (CCD). Optical techniques have a number of drawbacks, including their relatively high cost, complexity, low image quality, and susceptibility to circumvention by using, for example, a photocopy of a fingerprint. Moreover, the optical system is subject to misalignment and breakage.

Another type of fingerprint acquisition system is disclosed in U.S. Pat. No. 4,353,056. In this system an array of capacitors are formed in a flexible substrate. When a finger comes in contact with the substrate, those capacitors directly under a ridge of the finger will be compressed, altering their capacitance. Those capacitors not under a ridge will not be compressed and hence their capacitances will be substantially unchanged. An image is obtained by measuring the capacitances of the various capacitors in the array. This method has a number of limitations, including its inability to form a quality image because it can only detect the presence or absence of ridges as well as its susceptibility to circumvention by using, for example, a plastic replica of a fingerprint. Additionally, manufacturing may be unduly complex because of the incompatibility between a flexible substrate and conventional integrated circuit fabrication techniques. Moreover, since the system must be flexible it cannot be protected by a resilient inflexible material such as diamond.

SUMMARY OF THE INVENTION

The present invention provides an apparatus and method for detecting topographic variations on an object such as a finger. The apparatus includes an array of sensing elements disposed on a substrate which each have a parasitic capacitance. An insulating receiving surface is disposed over the array of sensing elements and is adapted to receive the object such that a sensing element and a portion of the object located thereabove creates a measurable change in capacitance with respect to the parasitic capacitance. An electronic circuit is coupled to the array of sensing elements for measuring the measurable change in capacitance.

DETAILED DESCRIPTION

Figure 1:
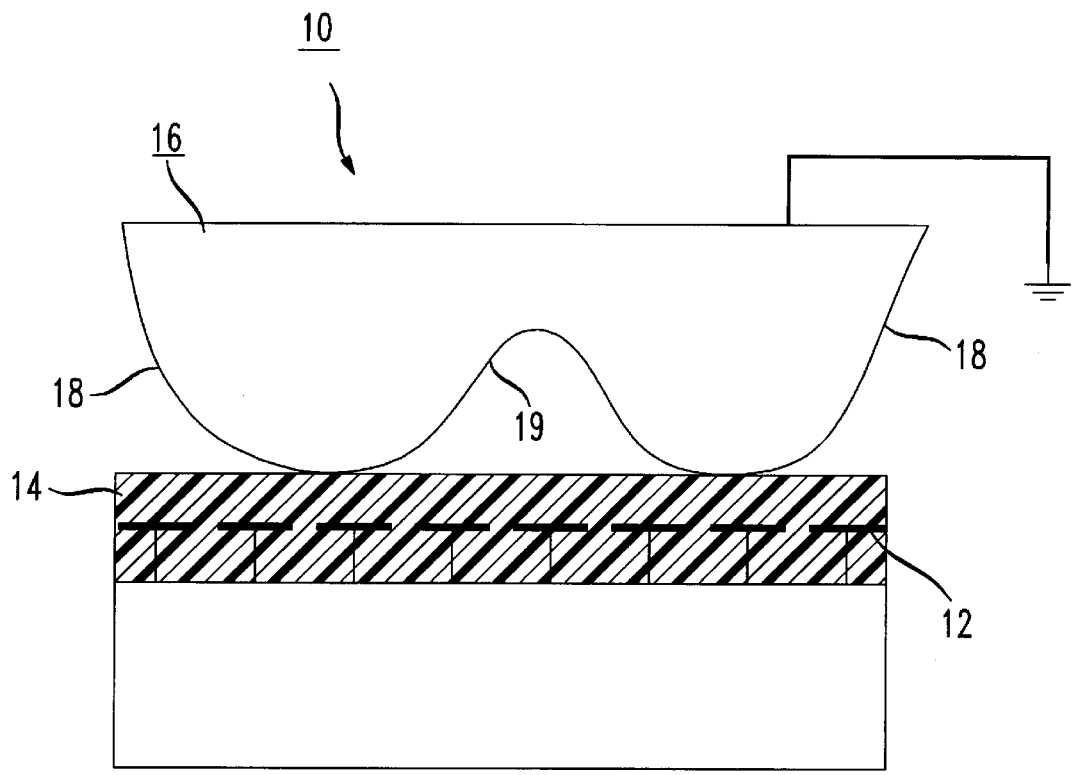
FIG. 1 shows a cross-sectional view of the array of sensing elements receiving two fingerprint ridges of a finger in accordance with the present invention.

FIG. 1 shows a topological sensor 10 that contains an array of sensing elements 12. The individual sensing elements 12 typically have dimensions smaller than the item under investigation. When used as a fingerprint sensor, the sensing elements should have dimensions that are smaller than the ridges and valleys of a finger. While the present invention will be described in terms of a fingerprint sensor, one of ordinary skill in the art will recognize that the invention is more generally applicable to the detection of topological variations in objects other than fingerprints. In such cases, the dimensions of the sensing elements should be chosen as appropriate for the selected object or objects. Disposed above the sensing elements is a suitable insulating material such as glass or plastic, for example, which serves as a sensing surface 14.

FIG. 1 also shows a finger 16 under investigation which is brought in contact with the sensing surface 14. Because the surface of a finger is uneven, certain portions of the finger (ridges 18) will physically contact the sensing surface while other portions (valleys 19) will be spaced apart from the sensing surface 14. Each sensing element 12 forms a capacitor with the portion of the finger located directly thereabove. The sensing elements 12 form one set of electrodes or plates for the capacitors and the ridges and valleys of the finger form the other set of electrodes or plates for the capacitors.

As is well known, the capacitance C of a capacitor is determined by $$C = k(A/d) \tag{1}$$

where C is the capacitance, k is the dielectric constant, A is the surface area of the capacitor and d is distance between electrodes. It is also known that a capacitor stores a charge Q determined by $$Q = CV \tag{2}$$

where Q is the stored charge, and V is the voltage applied across the electrodes.

From (1) it is clear that the capacitance of a capacitor is proportional to the distance between the electrodes. As such, the capacitance of the array of capacitors formed between the sensing elements and the finger will vary with finger topography. Specifically, the capacitance of a capacitor formed between a sensing element 12 and a valley 19 of the finger will be less than the capacitance of a capacitor formed between a sensing element 12 and a ridge 18 of the finger. Capacitors formed between the sensing elements 12 and regions of the finger intermediate to the ridges and valleys will have capacitances between the limits defined by the ridges and valleys.

The capacitance information embodied in the array of capacitors is sufficient to represent the topography of the finger under investigation. The capacitances of the array of capacitors may be subsequently transformed into a signal representing, for example, an image to form a visual representation of this topography. In contrast to the system disclosed in U.S. Pat. No. 4,353,056, the present invention advantageously does not require a flexible substrate since only one plate of each capacitor is located in the sensor itself.

Figure 2:
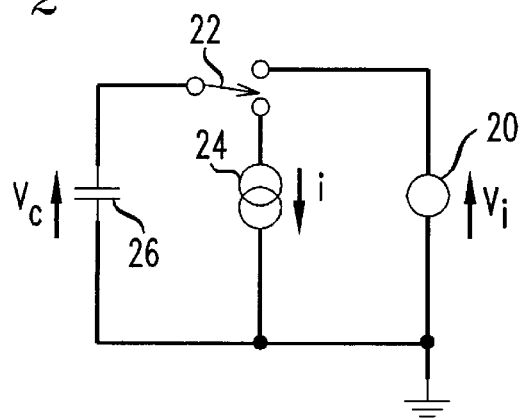
FIG. 2 shows an example of circuit that may be employed by the present invention to measure the capacitance of the capacitors formed by the sensing elements and the finger shown in FIG. 1.

One example of a circuit that may be employed to measure the capacitance of the capacitors is shown in FIG. 2. In operation, the finger is placed on the sensing surface 14 and the capacitors are brought to a known potential $V_i$ by connecting the array of sensing elements to a voltage source 20 via a switch 22. A given capacitor 26 having capacitance C now contains a charge $q_i = CV_i$. With the finger still in place on the sensing surface 14, the array of sensing elements are disconnected from the voltage source 20 and connected to a current source 24 via switch 22. The connection between the sensing elements 12 and the current source 24 is maintained for a fixed period of time t. The amount of charge drained from a given capacitor is $q_k$=it, where i is the current generated by the current source 24. At the end of time period t the potential of the sensing element 12 can be measured to obtain a value $V_f$. The capacitance of the given capacitor 26 can now be calculated from the relationship q=CV, where q is now the charge $q_k$ drained from the capacitor and V is the difference between the initial potential $V_i$ and final potential $V_f$ of the electrodes. The capacitance of the capacitor 26 is thus given by the expression $$C=q_k/(V_i-V_f) \quad (3)$$

By measuring the capacitances of the array of capacitors it is possible to calculate from equation (1) the distance d between each sensing element 12 and the portion of the finger located thereabove. Of course, to obtain an image of the finger topography it is not necessary to actually calculate these distances. Rather, all that is required to obtain an image is the relative magnitude of the capacitances as they are distributed over the sensor array.

Of course, the sensing elements each have a parasitic capacitance with respect to other elements in the device. To detect the presence of a ridge, for example, the change in capacitance of the sensing element due to the presence of the ridge must be sufficiently large so that it is measurable with respect to the parasitic capacitance. For example, dynamic RAMs store data in small capacitors that typically have a relatively large parasitic capacitance. In comparison, the change in capacitance due to the presence of a ridge would be insignificant relative to the parasitic capacitance and would be virtually unmeasurable. Thus, since the parasitic capacitance of the capacitors in a RAM is substantially larger than the capacitance to be measured, dynamic RAMs would be unsuitable as fingerprint sensors.

The fingerprint sensor may be fabricated from any appropriate materials known in the art. In some applications it will be advantageous to employ solid state sensors that can contain in a single unit the sensing elements and associated circuitry to read out the value of each sensing element such as, for example, amplifiers, noise reduction circuitry, and analog-to-digital converters. Some examples of suitable integrated circuit devices include devices fabricated by conventional CMOS processing techniques. Such solid state devices are typically covered by a layer of silicon dioxide several microns thick. This layer may serve as the insulating layer that forms the sensing surface 14 located between the sensing elements and the finger under investigation. In some embodiments of the invention it may advantageous to provide a more resilient sensing surface which is better capable of withstanding abrasion due to repeated contacts with fingers. In such cases the silicon dioxide may be covered or replaced by a stronger insulating material such as diamond, for example.

In one particular embodiment of the invention the sensor is fabricated by a conventional CMOS process and the sensing elements are spaced apart from one another by approximately 50 microns to achieve a resolution of 300–500 dpi. The parasitic capacitance of the sensing elements without the finger in contact with the sensing surface is approximately 180 fF. When the sensing surface receives the finger the capacitance of those sensing elements contacting the finger increases to approximately 350 fF under typical environmental conditions.

The sensor may be incorporated into a variety of different devices to provide an indication that a person having possession of the device is authorized to use the device. For example, authentication cards such as credit cards, debt cards, smart cards, etc., often require the user to provide a personal identification number (PIN) prior to use. If the card itself is misappropriated, the PIN would not be known to unauthorized users. However, the PIN would be given to and known by a merchant when the card holder initiates a transaction. It is also possible for the PIN to be misappropriated by a person who overhears a transaction or observes the cardholder as the PIN is written or entered via a keyboard or by a vendor to whom the customer gives the PIN to authorize themselves.

These problems can be overcome by incorporating the fingerprint sensor of the present invention into an authorization card. The card includes circuitry for comparing the acquired fingerprint against those of an authorized user or users, which are stored in a memory incorporated into the card. When the card is presented for use, the user verifies that he or she is an authorized user by placing a finger on the sensor located on the card.

The fingerprint sensor also may be incorporated into other validation devices that store fingerprints of authorized users. For example, the fingerprint sensor may be incorporated into an automated teller machine (ATM). The user would be required to demonstrate that he or she is an authorized user prior to performing a transaction. The fingerprint sensor also may be incorporated into a validation or authorization device in possession of a merchant at a point of sale, for example.

We claim:

1. A sensor for detecting topographic variations on an object, comprising:

an array of sensing elements disposed on a substrate and each having a parasitic capacitance;

an insulating receiving surface disposed over said array of sensing elements, said receiving surface being adapted to receive the object such that a sensing element and a portion of said object located there above creates a measurable change in capacitance with respect to said parasitic capacitance;

an electronic circuit coupled to said array of sensing elements for measuring relative magnitudes of said measurable change in capacitance of the sensing elements as the sensing elements are distributed over the array including, a voltage source for imparting a first potential on said sensing elements; a current source for draining charge at a constant rate for a prescribed method of time from said respective sensing elements in said array after the first potential has been applied; and a circuit for reading a second potential from each of said respective sensing elements in the array after the prescribed period of time, and outputing a signal indicating the relative capacitance caused by the object on each respective sensing element in the array based on the first and second potentials, the constant rate of discharge and the prescribed period of time.

2. The sensor of claim 1, wherein sensing elements are configured to detect topographic variations constituting a fingerprint on a finger.

3. The sensor of claim 2, wherein said sensing elements are spaced apart from each other by approximately 50 microns.

4. The sensor of claim 2, wherein said parasitic capacitance is approximately 180 fF.

5. The sensor of claim 2, wherein said array of sensing elements are of a type fabricated by CMOS technology.

6. The sensor of claim 1, wherein said array of sensing elements are of a type fabricated by CMOS technology.

7. In combination with a device that authenticates a user prior to use thereof, a sensor for detecting a fingerprint on a finger, said sensor comprising:

an array of sensing elements disposed on a substrate and each having a parasitic capacitance;

an insulating receiving surface disposed over said array of sensing elements, said receiving surface being adapted to receive the finger such that a sensing element and a portion of said finger located there above creates a measurable change in capacitance with respect to said parasitic capacitance;

an electronic circuit coupled to said array of sensing elements for measuring relative magnitudes of said measurable change in capacitance of the sensing elements as the sensing elements are distributed over the array to provide a signal representing said fingerprint including, a voltage source for imparting a first potential on said sensing elements; a current source for draining charge at a constant rate for a prescribed period of time from said respective sensing elements in said array after the first potential has been applied; and a circuit for reading a second potential from each of said respective sensing elements in the array after the prescribed period of time and outputting a signal indicating the relative capacitance caused by the finger on each respective sensing element in the array based on the first and second potentials, the constant rate of discharge, and the prescribed period of time;

a memory for storing a fingerprint of at least one authorized user;

a circuit for comparing said signal against said stored fingerprint.

8. The combination of claim 7, wherein said device is an authorization card, including circuitry for storing data representing fingerprints of authorized users.

9. A method for detecting topographic variations on an object, said method comprising the steps of:

receiving the object on an insulating surface disposed over an array of sensing elements each having a parasitic capacitance such that a sensing element and a portion of said object located there above creates a measurable change in capacitance with respect to said parasitic capacitance; and generating a signal representing said topographic variations by measuring relative magnitudes of said measurable changes in capacitance of said sensing elements as the sensing elements are distributed over in the array, wherein generating the signal includes, charging to a first potential said array of sensing elements, applying a controlled amount of current to cause a constant rate of discharge for a prescribed time period to said respective sensing elements in the array after the first potential has been applied, measuring changes in potential of said respective sensing elements in the array with respect to said first potential afte the prescribed period of time, and thereafter outputting a signal indicating the relative capacitance caused by the object on each respective sensing element in the array based on the changes in potential, the constant rate of discharge, and said prescribed time period.

10. The method of claim 9, wherein the step of receiving the object comprises the step of receiving a finger and the step of generating a signal comprises the step of generating a signal representing a fingerprint on said finger.

11. A method for authenticating a user prior to use of a device, said method comprising the steps of:

receiving a finger of the user on an insulating surface disposed over an array of sensing elements located on said device, each of said sensing elements having a parasitic capacitance such that a sensing element and a portion of said finger located there above creates a measurable change in capacitance with respect to said parasitic capacitance;

generating a signal representing a fingerprint of said finger by measuring relative magnitudes of said measurable changes in capacitance of said sensing elements as the sensing elements are distributed over the array, wherein generating the signal includes, charging to a first potential said array of sensing elements, applying a controlled amount of current to cause a constant rate of discharge for a prescribed time period to said respective sensing elements in the array after the first potential has been applied, measuring changesin potential of said respective sensing elements in the array with respect to said first potential after the prescribed period of time, and thereafter outputting a signal indicating the relative capacitance caused by the object on each respective sensing element in the array based on the changes in potential, the constant rate of discharge, and said prescribed time period; and comparing said signal against a stored fingerprint of at least one authorized user.

12. The method of claim 11, wherein said device is an authorization card, including a memory for storing data representing fingerprints of authorized users.

13. The method of claim 11, wherein said device is an automated teller machine.

14. The method of claim 11, wherein said device is a authorization device at a point of sale.

15. The method of claim 11, wherein said device is an authorization card, including:

a memory for storing data representing fingerprints of authorized users; and circuitry for comparing data representing an acquired fingerprint against the fingerprints of authorized users.

* * * * *